US009226172B2

United States Patent
Nam et al.

(10) Patent No.: US 9,226,172 B2
(45) Date of Patent: Dec. 29, 2015

(54) VOIP PROCESSING METHOD AND APPARATUS OF MOBILE TERMINAL IN MOBILE COMMUNICATION SYSTEM

(71) Applicant: Samsung Electronics Co., Ltd., Gyeonggi-do (KR)

(72) Inventors: Hyeongmin Nam, Gyeonggi-do (KR); Joongseok Park, Gyeonggi-do (KR); Kiyoung Lim, Gyeonggi-do (KR); Jaehoon Han, Gyeonggi-do (KR); Yosoon Kim, Seoul (KR); Joonsung Chun, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 154 days.

(21) Appl. No.: 13/769,786

(22) Filed: Feb. 18, 2013

(65) Prior Publication Data

US 2013/0215827 A1 Aug. 22, 2013

(30) Foreign Application Priority Data

Feb. 16, 2012 (KR) .................. 10-2012-0015661

(51) Int. Cl.
*H04W 4/00* (2009.01)
*H04W 24/02* (2009.01)
*H04L 29/06* (2006.01)

(52) U.S. Cl.
CPC ........... *H04W 24/02* (2013.01); *H04L 65/1059* (2013.01); *H04L 65/602* (2013.01); *H04L 65/604* (2013.01); *H04W 4/001* (2013.01)

(58) Field of Classification Search
USPC ......... 370/328, 329, 352, 338, 401, 315, 389, 370/331, 465; 455/422.1
See application file for complete search history.

(56) References Cited

U.S. PATENT DOCUMENTS

2004/0266421 A1* 12/2004 Kato et al. ................. 455/422.1
2006/0268837 A1 11/2006 Larsson et al.
2011/0153723 A1 6/2011 Mutnuru et al.

OTHER PUBLICATIONS

Extended European Search Report dated Dec. 2, 2013 in connection with European Patent Application No. 13155513.8, 8 pages.
Zhai, et al.; "An Application of VoIP Communication on Embedded System"; 2010 International Conference on Computer Application and System Modeling; Oct. 22, 2010; pp. 619-623.
(Continued)

*Primary Examiner* — Chi H Pham
*Assistant Examiner* — Alexander O Boakye

(57) ABSTRACT

An improved VoIP (Voice over Internet Protocol) processing method and apparatus reduce the processing delay of a mobile terminal in the mobile communication system. The VoIP processing apparatus includes a Radio Frequency (RF) unit configured to transmit and receive a VoIP packet, and an audio processing unit configured to process audio signals. The apparatus also includes a voice engine configured to determine, when VoIP packet processing is requested, whether a dedicated voice path for processing the VoIP packet exists and control, when the dedicated voice path exists, to process voice signal input/output using a dedicated VoIP processing interface for processing the VoIP packet. The VoIP processing method and apparatus are capable of reducing voice delay by improving the audio paths between VoIP applications and terminal platform.

20 Claims, 7 Drawing Sheets

(56) References Cited

OTHER PUBLICATIONS

Lin, et al.; "Software Integration for Applications with Audio Stream"; International Conference on Intelligent Information Hiding and Multimedia Signal Processing; Aug. 15, 2008; IEEE; pp. 1126-1129.

Li, et al; "Research on porting technology of Kaffe virtual machine based on ARM7/uClinux"; Computational Intelligence and Software Engineering; Dec. 11, 2009; IEEE; 6 pages.

* cited by examiner

VOIP PROCESSING METHOD AND APPARATUS OF MOBILE TERMINAL IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 16, 2012 and assigned Serial No. 10-2012-0015661, the entire disclosure of which is hereby incorporated by reference.

TECHNICAL FIELD OF THE INVENTION

The present disclosure relates to a mobile communication system and, in particular, to a VOIP (Voice over Internet Protocol) processing method and apparatus of a mobile terminal for improving voice communication service in the mobile communication system.

BACKGROUND OF THE INVENTION

Internet telephony or voice communication over IP networks (hereinafter, referred to as VoIP) may not be able to ensure Quality of Service (QoS) due to the possibility of excessive end-to-end delay, packet loss, high delay, jitter, and the like, because the Internet Protocol (IP) network is a best-effort network. Among these factors, voice delay is one of the most significant factors influencing the service quality. The user starts feeling uncomfortable with the delay longer than 200 ms and, if the delay becomes longer than 400 ms, most people complain of significant inconvenience. Accordingly, it is desirable to improve real-time characteristics of voice communication by reducing the end-to-end delay. The end-to-end delay roughly includes processing delay and network delay.

The processing delay is the total delay incurred by both the sender and receiver while processing the voice signals with the exception of the time the packet propagates the network. The processing delay includes the transmitter delay of encoding the voice signal input, through a microphone and transmitting encoded Real-Time Protocol (RTP) packet, and the receiver delay of decoding the received packet and outputting the decoded voice signal through a speaker. Research is being conducted for technologies to reduce the delays in capturing, encoding, decoding, and rendering the voice signal.

Recently, the VoIP service for the Android® operating system-based smartphone users is introduced by Social Network Service (SNS) providers as well as the network operators, and the service competition is becoming intense. In spite of this situation, the end-to-end delay of the conventional Android® operating system-based VoIP service does not meet the requirement of 400 ms regardless of the application and type of terminal, and this is the big obstacle for securing the VoIP service quality on the Android® platform.

SUMMARY OF THE INVENTION

To address the above-discussed deficiencies of the prior art, it is a primary object of the present disclosure to provide a method and apparatus for providing VoIP service with improved quality in a mobile communication system.

It is another object of the present disclosure to provide a method and apparatus for providing VoIP service that is capable of reducing the internal processing delay of the mobile terminal by introducing a VoIP packet-dedicated voice path for processing the VoIP packet separate from the audio procession path provided by the operating system of the mobile terminal.

It is still another object of the present disclosure to provide a method and apparatus for providing VoIP service that is capable of reducing the end-to-end voice delay by minimizing extra delay caused by the Android® platform and by installing delay reduction algorithms optimized for different types of terminals selectively.

In accordance with an aspect of the present disclosure, a Voice over IP (VoIP) processing apparatus of a mobile terminal in a mobile communication system includes a Radio Frequency (RF) unit configured to transmit and receive a VoIP packet. The apparatus also includes an audio processing unit configured to process audio signals. The apparatus further includes a voice engine configured to determine, when VoIP packet processing is requested, whether a dedicated voice path for processing the VoIP packet exists and control, when the dedicated voice path exists, to process voice signal input/output using a dedicated VoIP processing interface for processing the VoIP packet.

In accordance with another aspect of the present disclosure, a Voice over IP (VoIP) processing method of a mobile terminal in a mobile communication system includes receiving a VoIP packet processing request. The method also includes determining whether a dedicated voice path for processing the VoIP packet exists. The method further includes processing, when the dedicated voice path exists, voice signal input/output using a dedicated VoIP processing interface for processing the VoIP packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus or system. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
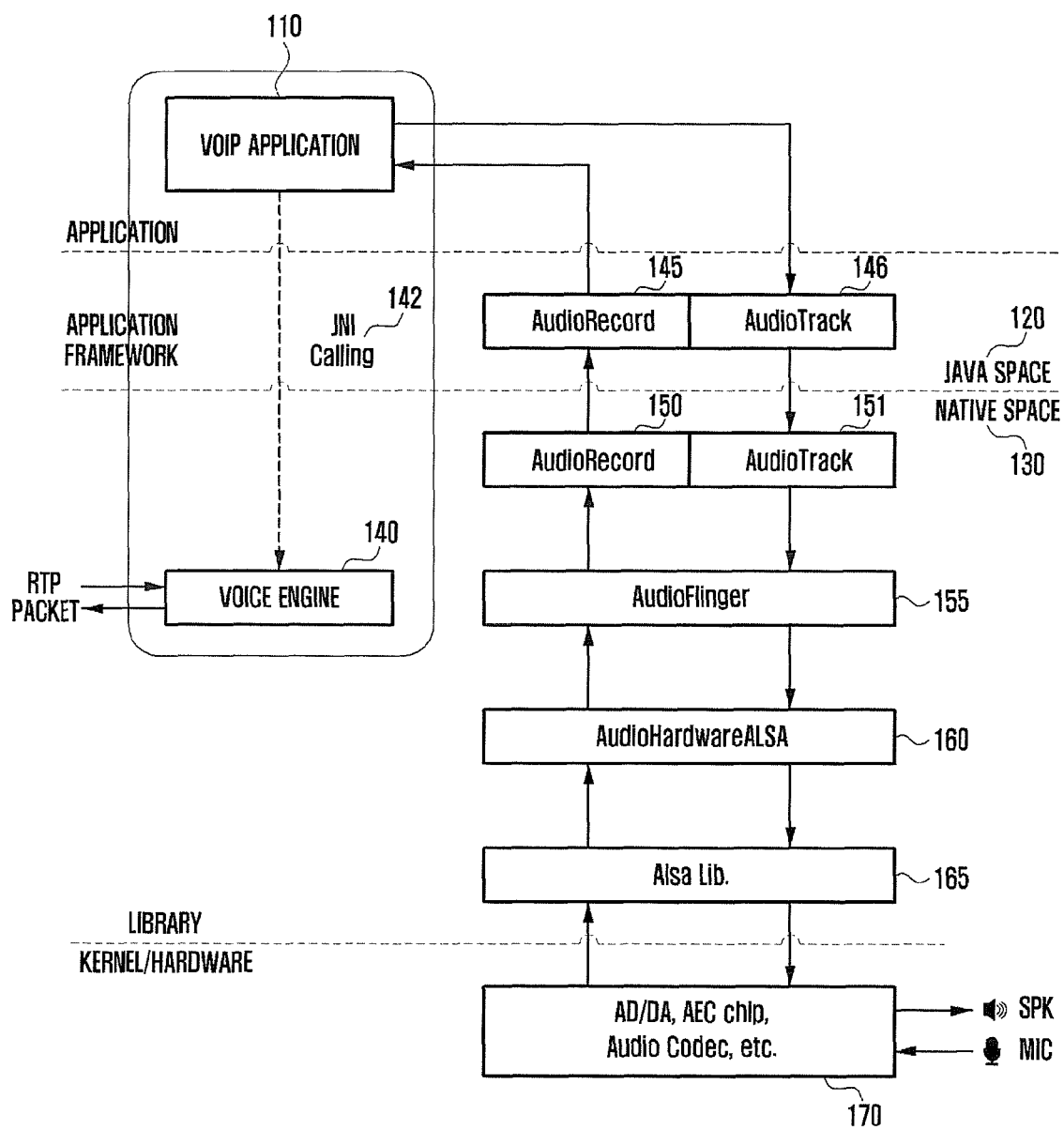
FIG. 1 is a block diagram illustrating the VoIP processing architecture based on an operating system, particularly the Android® platform, to which the present disclosure is applied.

FIG. 1 is a block diagram illustrating the VoIP processing architecture based on an operating system, particularly the Android® platform, to which the present disclosure is applied. In the following description, the conventional VoIP processing method on the Android® platform is interchangeably referred to as Direct Audio Path 0 (DAP 0). Here, 0 means that no dedicated voice path for processing the VoIP packet directly exists in an embodiment of the present disclosure to be described hereinafter.

Referring to FIG. 1, the Android® platform provides an Application Programming Interface (API) for voice input/output through an audio recording/audio track. The VoIP application 110 operates in a Java Space 120 through the API provided by the Android® platform which controls the drivers in the Native Space 130. The Java has a drawback in that the processing performance is degraded due to the low execution speed as compared to the application generated in the Native Space 130. Accordingly, the Voice Engine 140 is implemented in the Native Space 130, and the VoIP application 110 controls the voice engine 130 through Java Native Interface (JNI) 142 on the Android® platform. Although the VoIP application 110 and the voice engine 140 are separated in FIG. 1, such a depiction is only for the purpose of functional distinction. That is, the voice engine 140 is a block responsible for one of the functions of the VoIP application and implemented in the native space 130 and thus depicted as a separated block in FIG. 1.

The JNI 142 provides an interface for communication between the modules (e.g. C/++) of the Java space 120 and the native space 130. The JNI 142 is used for fast processing speed routine creation, hardware control, and legacy C/C++ program reuse.

A brief description is made of the Android® platform for processing voice including VoIP.

The VoIP application 110 is a user domain application program operating on the Virtual Machine (VM).

The AudioRecord 145 and AudioTrack 146 of the Java Space 120 are the Java threads on the Software Development Kit (SDK) that are generated for input (AudioRecord)/output (AudioTrack) of audio data of an application program.

The AudioRecord 150 and AudioTrack 151 of the Native Space 120 are the binder objects paired with the AudioRecord/AudioTrack generated by the application program.

The AudioFlinger 155 is a tread for calling an HAL API accessing the real input/output device by mixing the AudioTrack/AudioRecord data generated by a plurality of applications.

The audio hardware ALSA (HAL) 160 is a library specifying the interface (AudioHardware) standardized for minimizing change on the higher layer depending on the hardware.

The ALSA library 165 is a representative Audio standardization layer of Linux and provides various functions such as mixer and resampler as well as input/output function. In some embodiments, only the input/output function is used on the Android® platform.

Although not depicted in FIG. 1, the Android® platform is capable of including a Device Driver. The device driver is a device driver software implementing the function as specified in the standard of the sound device defined in the operating system and implemented differently depending on the hardware chipset.

The hardware 170 is a function block for outputting the sound generated in software through an analog device (DAC) and converting the signal input through an analog device to digital data (ADC).

A brief description is made of the general VoIP packet processing method based on the above-described Android® platform. If a VoIP packet arrives at the mobile terminal, the voice engine 140 of the VoIP application 110 detects the VoIP packet and delivers the voice packet to the audio track of the Java space 120. The VoIP packet is processed into a VoIP object through the audio track and output in the form of voice through the path of audio track 151, audio flinger 155, audio hardware ALSA 160, ALSA library 165, and the speaker as a hardware device.

The analog voice signal input through the microphone is generated as a VoIP packet through the signal path adverse to the above described signal path to be transmitted to the recipient terminal.

For the Android® VoIP application, the VoIP call is processed through several operations of the Android® framework as depicted in FIG. 1, i.e. audio record/audio track (Java space), audio record/audio track (native space), audio flinger, audioHAL, and ALSA. As a consequence, the Android® platform (i.e. framework) causes extra delay of 150-200 ms regardless of the types of terminal and VoIP application.

When the voice engine is placed in the native space and uses the audio record/track directly, this also incurs extra delay caused by creation of audio record/track thread and increase of stepwise buffer. The voice communication quality degradation caused by this extra delay is considered a limitation of the Android®-based VoIP service.

The present disclosure describes a method for reducing the end-to-end voice delay by minimizing the extra delay incurred on the Android® platform and applying delay reduction algorithms optimized for different types of terminals selectively, resulting in an improvement of VoIP service quality.

Figure 2:
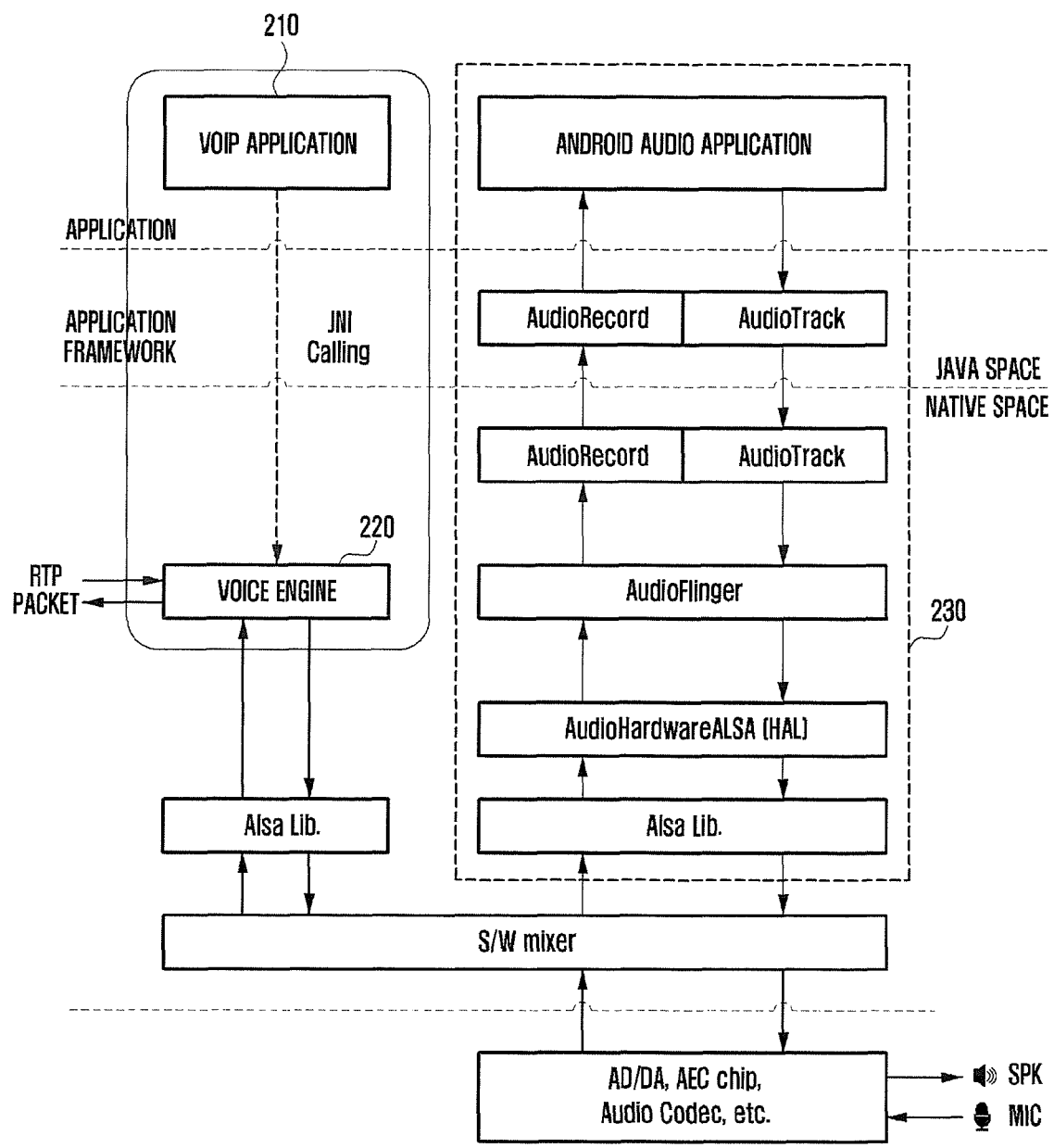
FIG. 2 is a block diagram illustrating the VoIP processing architecture with a VoIP packet processing path in VoIP communication according to a first embodiment of the present disclosure.

FIG. 2 is a block diagram illustrating a VoIP processing architecture with a VoIP packet processing path in VoIP communication according to a first embodiment of the present disclosure. In the following description, the VoIP packet processing method according to the first embodiment of the present disclosure is interchangeably referred to as Direct Audio Path 1 (DAP 1).

As shown in FIG. 2, the VoIP processing apparatus according to an embodiment of the present disclosure includes a VoIP application (Java Space) 210, a voice engine (native space) 220, and an Android® platform 230.

A description is made in more detail with reference to FIG. 2. The mobile terminal operates differently depending on the executed VoIP application and whether to process a received VoIP packet or and input voice signal.

The voice engine 220 of the mobile terminal receives a VoIP packet transmitted using RTF protocol by means of the transceiver. The voice engine 220 is the engine included logically in the VoIP application 210 for processing VoIP voice and can be implemented in the Java space or the native space according to the developer's intention. In an embodiment of the present disclosure, the voice engine 220 is implemented in the native space; however the present disclosure is not limited thereto.

Upon receipt of the VoIP packet, the voice engine extracts the header of the VoIP packet to perform decoding. As a consequence, the voice engine 220 is capable of acquiring the original voice data. In this embodiment, the voice engine 220 calls the ALSA library in the native space to process the acquired original voice data and output the processed voice data through the speaker without involvement of the Android® audio application 230.

As described above, the VoIP-dedicated voice path formed via the voice engine 220, ALSA library, and speaker according to an embodiment of the present disclosure is established through relatively simple processing operations as compared to the legacy voice path formed via the Android® audio application. Since the audio track/record operation is skipped, it is possible to reduce the audio processing delay dramatically.

The audio input/output of the VoIP application is controlled by means of the voice engine 220 through JNI. The voice engine 220 performs voice input/output for VoIP packet using Advanced Linux Sound Architecture (ALSA) library.

In an embodiment of the present disclosure, the audio playback and/or recording of other Android® applications with the exception of the VoIP packet application is processed through the same audio path as the legacy and droid application. In this embodiment, the VoIP packet (RTP packet) and the legacy Android® application audio data are mixed by a software mixer of the Advanced Linux Sound Architecture (ALSA).

If a voice signal is input through the microphone after the execution of the VoIP application 210, the VoIP packets are generated in the adverse order to the voice output processing order and transmitted to the counterpart terminal. That is, the digital signal obtained by converting the signal input through the microphone is delivered to the voice engine through the mixer and ALSA library. The voice engine 220 compresses the original voice data and adds a header to generate a VoIP packet, which is transmitted through the transceiver.

In the legacy Android®-based terminal as depicted in FIG. 1, the voice passes several stepwise audio paths, resulting in voice delay. In the first embodiment of the present disclosure as depicted in FIG. 2, a dedicated VoIP audio path is formed separately from the common audio path of the Android® framework so as to reduce the number of stepwise paths of the VoIP packet, resulting in reduction of voice delay.

Figure 3:
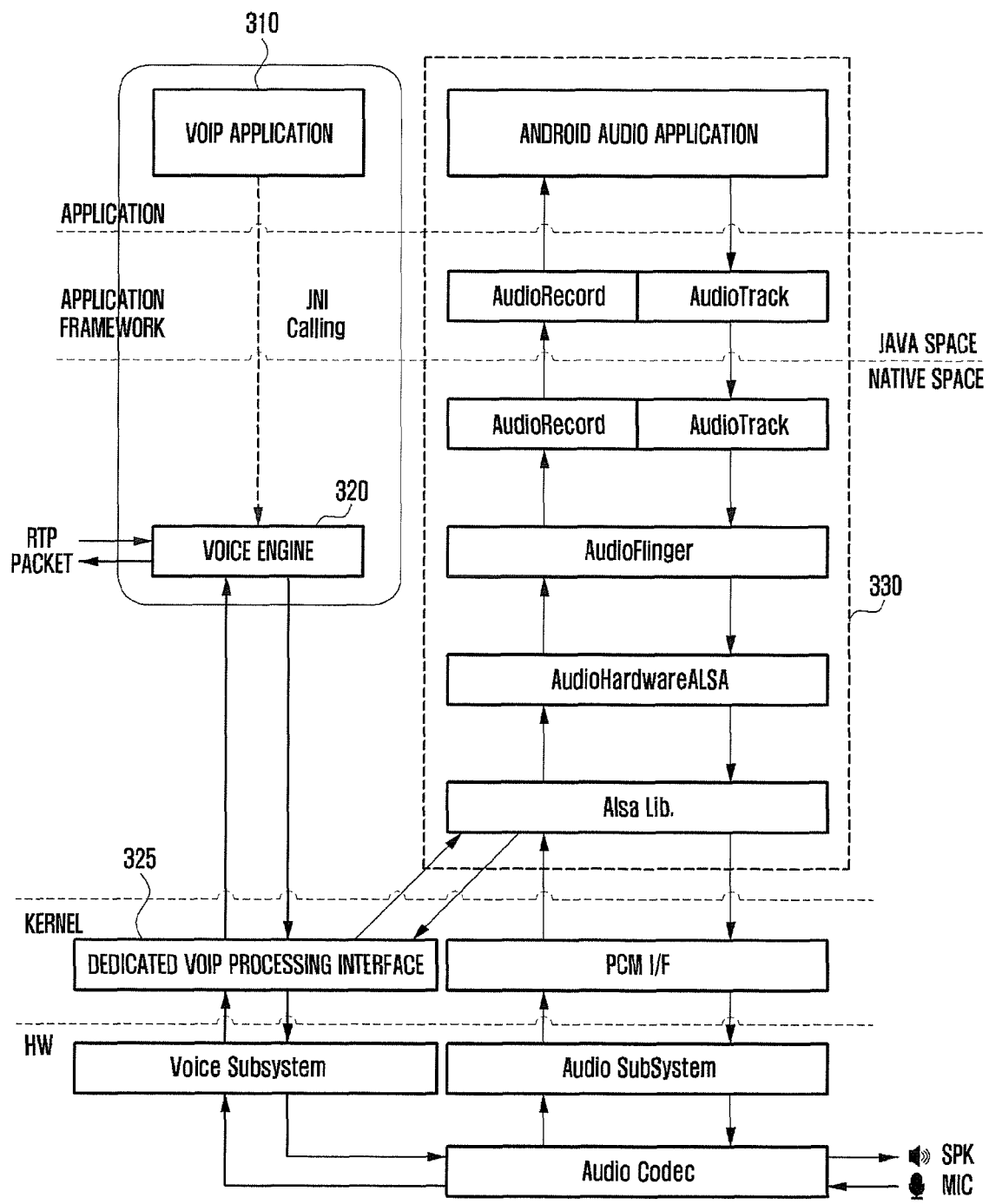
FIG. 3 is a block diagram illustrating the VoIP processing architecture with a VoIP packet processing path in VoIP communication according to a second embodiment of the present disclosure.

FIG. 3 is a block diagram illustrating a VoIP processing architecture with a VoIP packet processing path in VoIP communication according to a second embodiment of the present disclosure. In the following description, the VoIP packet processing method according to the second embodiment of the present disclosure is interchangeably referred to as Direct Audio Path 2 (DAP 2).

As shown in FIG. 3, the VoIP processing apparatus according to an embodiment of the present disclosure includes a VoIP application (Java Space) 310, a voice engine (native space) 320, and an Android® platform 330.

Referring to FIG. 3, if a VoIP application is executed in the mobile terminal and if a VoIP packet is received, the voice engine 320 of the VoIP application 310 detects the receipt of the VoIP packet. The voice engine 320 is capable of acquiring the original voice data from the VoIP packet.

Once the original voice data is acquired, the voice engine 320 controls the hardware directly through a voice input/output interface of the call processor (i.e., the dedicated VoIP processing interface 325) to output the original voice data through the speaker without passing through the Android® audio application 330. The dedicated VoIP processing interface 325 is positioned in the kernel space and controls a voice subsystem (a kind of chip) for controlling the voice system in the hardware domain.

In the second embodiment as depicted in FIG. 3, the voice engine 220 calls the dedicated VoIP processing interface 325 directly to process the VoIP packet.

Although the diagram has been depicted to show a logical configuration, the dedicated VoIP processing interface 325 can be configured to call the audio record/track part of the Android® platform (operating system) in the real system. In this situation, the procedure following the operation where the dedicated VoIP processing interface 325 calls the audio record/track part can be configured to process the VoIP packet and normal voice packet distinctively to generate objects in different formats. That is, the VoIP and normal voice packets are managed separately by creating a dedicated VoIP audio object for a VoIP packet including VoIP content and a normal audio object for a normal voice packet.

The VoIP and normal voice packets are mixed by the audio flinger in collision, e.g. outputting push button sound in VoIP call processing. In this way, it is possible to process the audio playback and/or recording of the Android® frame simultaneously in VoIP call processing according to an embodiment of the present disclosure.

Although the description has been directed to the procedure of processing VoIP packets received by the mobile terminal, the present disclosure also can be applied to the procedure for processing the user voice input through the microphone of the mobile terminal into the voice packet.

If the VoIP application is executed, the voice engine 320 initializes the microphone and monitor to detect the input of user voice. The analog voice signal input through the microphone is converted to a digital voice signal. The voice engine 320 detects the execution of the VoIP application and delivers the converted digital voice signal to the dedicated VoIP processing interface 325 directly other than the Android® framework. The voice engine 320 encodes the digital voice signal and adds a header to generate a VoIP packet which is transmitted to the counterpart terminal.

Figure 4:
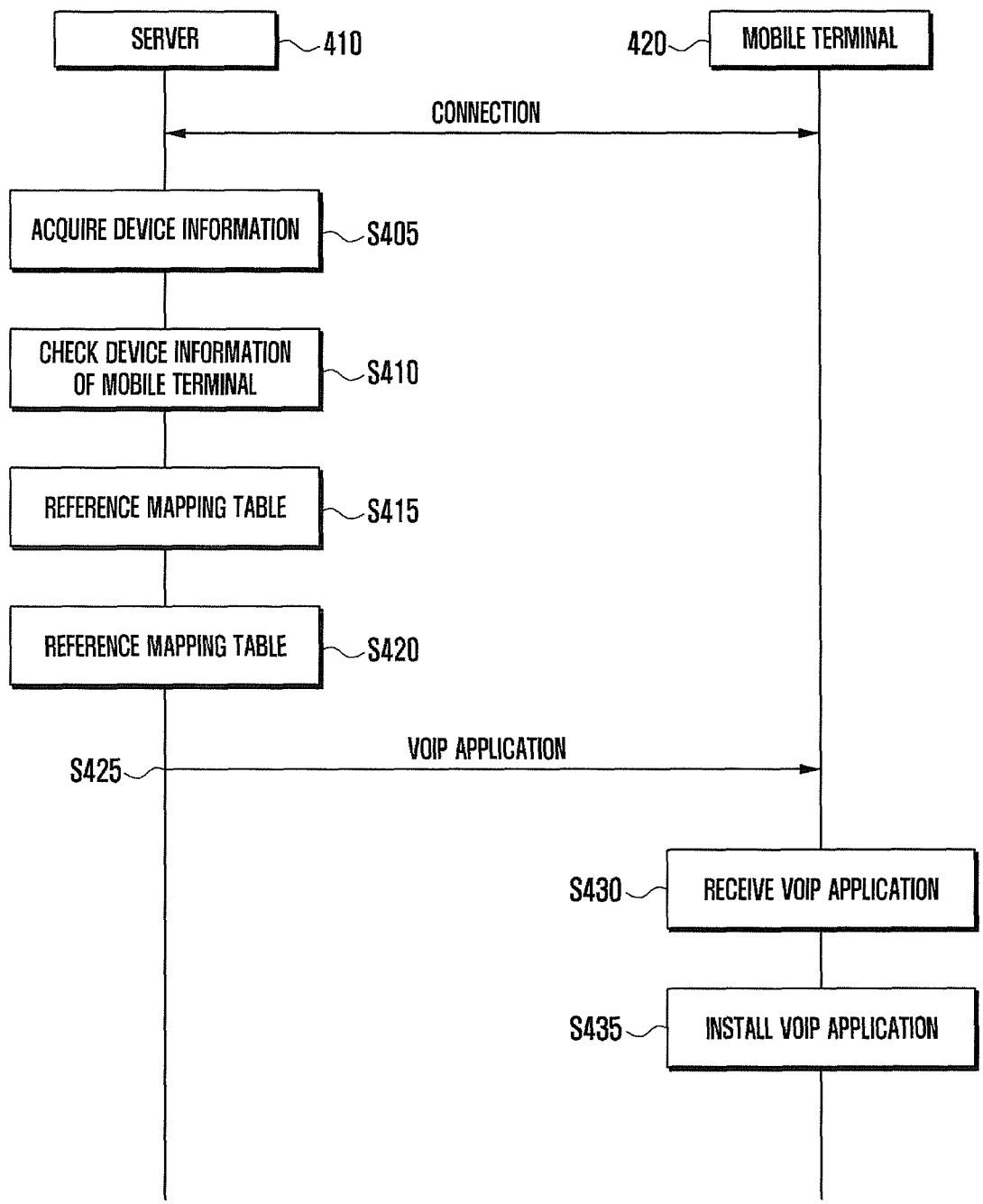
FIG. 4 is a signal flow diagram illustrating a procedure of installing a VoIP application in a mobile terminal according to an embodiment of the present disclosure.

FIG. 4 is a signal flow diagram illustrating a procedure of installing a VoIP application in a mobile terminal according to an embodiment of the present disclosure.

FIG. 4 shows an embodiment in which the server 410 sends the mobile terminal 420 a VoIP application to be installed in the mobile terminal 420.

It is assumed that the server 410 and the mobile terminal 420 are communicatively connected to each other. The connection can be established in various ways, e.g., the mobile terminal 420 is capable of accessing the server 410 retaining the VoIP application to download the VoIP application, or the server 410 is capable of connecting to the mobile terminal 420 through a radio management function to install the VoIP application.

The server 410 acquires the information of the mobile terminal 420 (device information or DI) in which the VoIP application is to be installed at operation S405. The server 410 checks the information such as device model and firmware version of the mobile terminal at operation S410.

The server 410 looks up the audio path mapping table based on the mobile terminal information at operation S415. The mapping table sorts VoIP application types into groups by device type as shown in Table 1.

TABLE 1

| Device type | VoIP application type |
| --- | --- |
| Omnia | DAP 0 |
| Galaxy S | DAP 0, DAP 1 |
| Galaxy S2 | DAP 0, DAP 1, DAP 2 |
| Galax Note | DAP 0, DAP 1, DAP 2 |
| - | - |
| - | - |
| - | - |

By referencing the mapping table, the server 410 checks the types of VoIP applications that can be installed in the mobile terminal 200 at operation S420. The server 410 selects a VoIP application corresponding to the checked VoIP application type. According to an embodiment of the present disclosure, if the type of the mobile terminal is Galaxy S2, the server 410 checks that all VoIP application types of DAP 0, DAP 1, and DAP 2 are supported and selects a VoIP application supporting all of the DAP 0, DAP 1, and DAP 2. The server transmits the selected VoIP application to the mobile terminal 420 at operation S425.

The mobile terminal 420 receives the VoIP application transmitted by the server 410 at operation S430 and installs the received VoIP application at operation S435.

Figure 5:
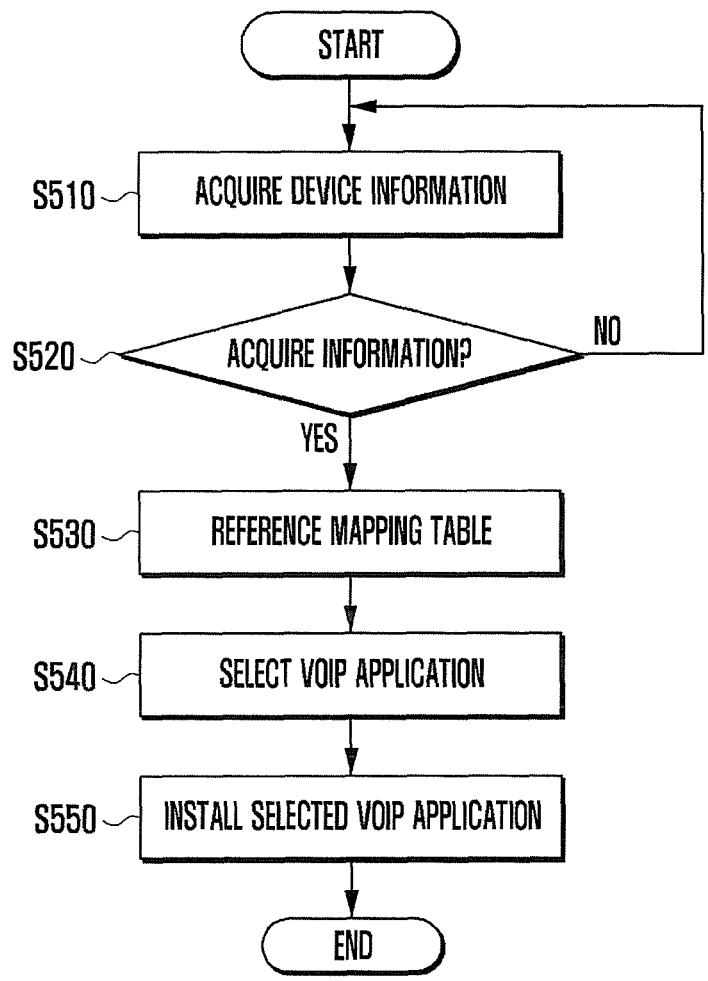
FIG. 5 is a flowchart illustrating a procedure of installing a VoIP application in a mobile terminal according to an embodiment of the present disclosure.

FIG. 5 is a flowchart illustrating a procedure of checking device information and installing a VoIP application at a mobile terminal according to an embodiment of the present disclosure.

The mobile terminal attempts to acquire its own device information at operation S510. The mobile terminal determines whether the information on its own device model and firmware version has been acquired at operation S520 and, if not acquired, returns the procedure to operation S510.

If the information is acquired, the mobile terminal references the audio path mapping table based on its own device information at operation S530. The mapping table sorts VoIP application types into groups by device type and structured as shown in Table 1.

By referencing the mapping table, the mobile terminal checks the types of VoIP applications and selects a VoIP application of the checked VoIP application type at operation S540.

Finally, the mobile terminal installs the selected VoIP application at operation S550.

Figure 6:
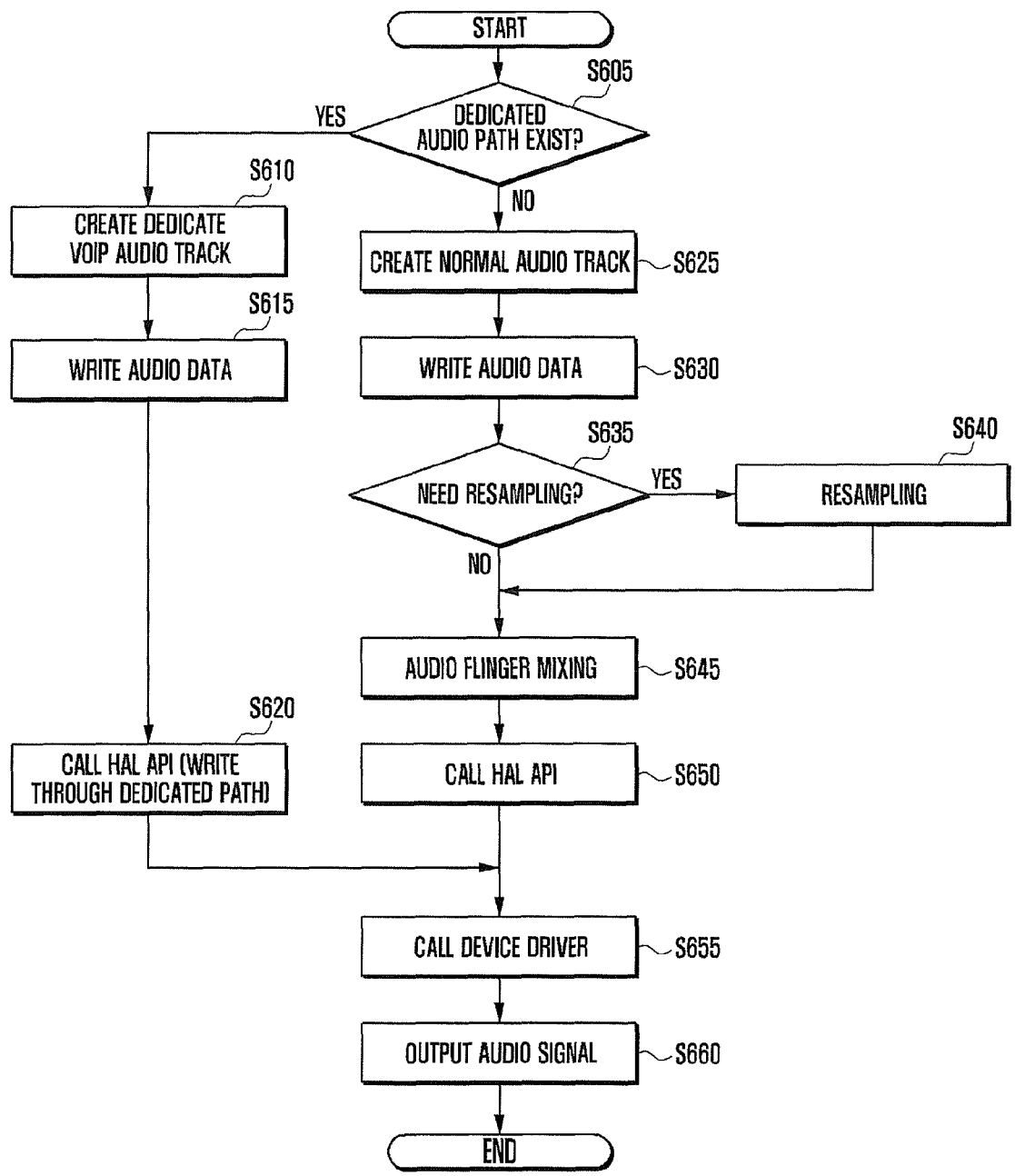
FIG. 6 is a flowchart illustrating a procedure of processing a VoIP packet in a mobile terminal according to an embodiment of the present disclosure.

FIG. 6 is a flowchart illustrating a procedure of processing a VoIP packet in a mobile terminal according to an embodiment of the present disclosure.

If a VoIP packet processing request is received, the mobile terminal determines whether a dedicated voice path is provided at operation S605. Determining whether a dedicated voice path is provided may include determining whether a VoIP application supporting DAP 1 or DAP 2 is installed.

If the dedicated voice path is provided, the mobile terminal generates a dedicated VoIP packet audio track at operation S610. This operation corresponds to the process of calling, at the voice engine of the mobile terminal, a voice input/output interface, e.g. dedicated VoIP processing interface, of the call processor. As described above, calling the dedicated VoIP processing interface is a logical process and can be implemented to call the audio record/track part of the Android® operating system in real system, and operation S610 is provided to perform this calling operation.

The mobile terminal writes the audio data at operation S615.

In order to control the collision with other audio data (e.g. button sound and effect sound), the mobile terminal calls the HAL API at operation S620. This corresponds to the process for the audio flinger of the Android® operating system to call the audio hardware ALSA library. Through this process, it is possible to avoid the collision between the VoIP packet and normal audio packet.

If no dedicated audio path is provided at operation S605, the mobile terminal establishes a normal audio track at operation S625. This corresponds to the operation of calling, at the Android® audio application, the audio record/track of the Java space and native space. In more detail, if the audio engine calls the audio record/track, a dedicated VoIP audio track is established. If the Android® audio application calls the audio record/track, a normal audio track is established. In this way, the VoIP processing method of the present disclosure creates and manages the dedicated VoIP audio track and the normal audio track distinctively.

If the normal audio track is created, the mobile terminal writes the audio data at operation S630. Next, the mobile terminal determines whether resampling is required at operation S635 and, if so, performs resampling at operation S640. Otherwise, if resampling is not required, the mobile terminal performs audio flinger mixing at operation S645. This operation is to mix the data of audio tracks created by multiple applications. The mobile terminal calls the HLR API to control collision with other audio data (e.g. button sound and effect sound) at operation S650.

Next, the mobile terminal calls the device driver at operation S655, and outputs the audio signal at operation S660.

Figure 7:
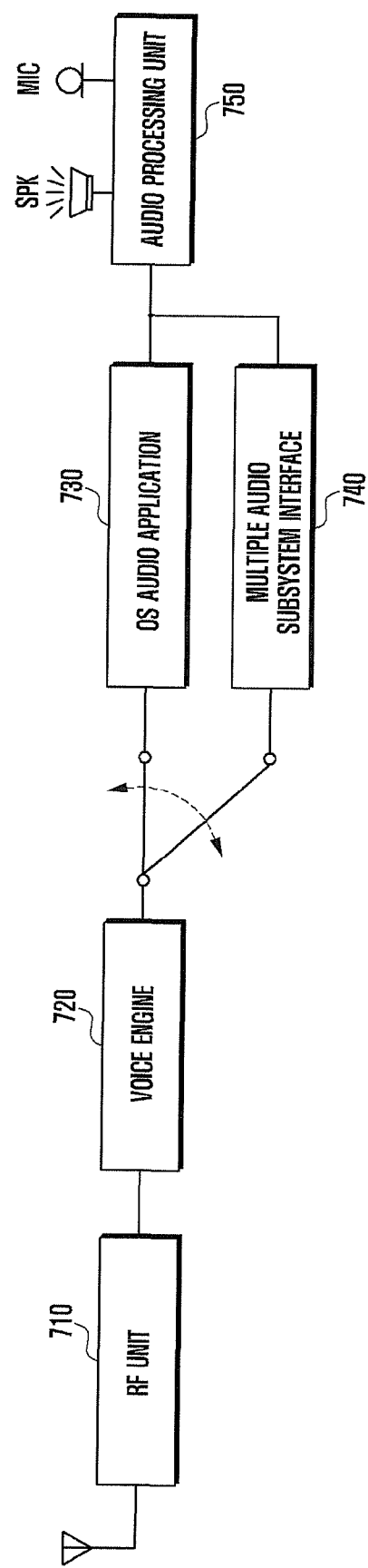
FIG. 7 is a block diagram illustrating a configuration of a VoIP processing apparatus according to an embodiment of the present disclosure.

FIG. 7 is a block diagram illustrating a configuration of a VoIP processing apparatus according to an embodiment of the present disclosure. As shown in FIG. 7, the VoIP processing apparatus according to an embodiment of the present disclosure includes a Radio Frequency (RF) unit 710, a voice engine 720, an OS audio application 730, a dedicated VoIP processing interface 740, and an audio processing unit 750.

The RF unit 710 is responsible for radio communication the VoIP processing apparatus for transmitting/receiving data. The RF unit 710 includes an RF transmitter for up-converting and amplifying a signal to be transmitted and an RF receiver for low noise amplifying and down-converting the received signal. The RF unit 710 also outputs the data received through a radio channel to the voice engine 720 and transmits the data output by the voice engine 720 to the counterpart terminal through the radio channel.

In an embodiment of the present disclosure, the RF unit 710 is capable of transmitting/receiving audio data and, especially in the VoIP voice communication mode, the VoIP packet using the RTP protocol.

The voice engine 720 controls the sequential processes for providing the VoIP service with improved quality in the mobile communication system. For this purpose, the voice engine 720 processes the VoIP packets through a dedicated voice path separate from the audio processing path provided by the operating system of the mobile terminal.

In detail, the voice engine 720 detects a VoIP packet processing request and determines whether a dedicated VoIP packet processing path exists. If the dedicated VoIP packet processing path exists, the voice engine 720 controls such that the voice signal input/output is processed through a dedicated VoIP processing interface for processing the VoIP packet dedicatedly. The dedicated VoIP processing interface is implemented in the kernel space and provides communication means for controlling the hardware related to the audio processing unit directly.

If no dedicated VoIP packet processing path exists, the voice engine 720 controls such that the voice signal input/output is processed through the audio application (OS audio application) 730 embedded in the operating system of the mobile terminal. In an embodiment, the OS audio application 730 may include the audio record and audio track in the Java space, the audio record and audio track in the native space, audio flinger, audio hardware (Advanced Linux Sound Architecture or ALSA), and ALSA library.

The audio engine 720 is implemented in the native space and, if the VoIP packet and normal voice packet are generated simultaneously, controls to process the VoIP packet and normal voice packet as mixed.

The audio processing unit 750 includes a codec pack composed of a data codec for processing packet data and an audio codec for processing the audio signal including voice. The audio processing unit 750 converts a digital audio signal to an analog audio signal by means of the audio codec to output through the audio signal through a speaker and converts an analog signal input through a microphone to a digital audio signal by means of the audio codec.

As described above, the VoIP processing method and apparatus of the present disclosure reduce voice delay by improving the audio paths between VoIP applications and terminal platform.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Voice over IP (VoIP) processing apparatus of a mobile terminal in a mobile communication system, the apparatus comprising:
   a Radio Frequency (RF) unit configured to transmit and receive a VoIP packet;
   an audio processing unit configured to process audio signals; and
   a voice engine configured to control, when a dedicated voice path for processing the VoIP packet separate from an audio processing path provided by an operating system of the mobile terminal exists, to process voice signal input/output using a dedicated VoIP processing interface for processing the VoIP packet.

2. The apparatus of claim 1, wherein the voice engine is configured to control, when no dedicated voice path exists, to process the voice signal input/output using an audio application embedded in the operating system of the mobile terminal.

3. The apparatus of claim 2, wherein the audio application comprises:
   an audio record and an audio track in a Java space; and
   an audio record, an audio track, an audio flinger, an audio hardware Advanced Linux Sound Architecture (ALSA), and an ALSA library in a native space.

4. The apparatus of claim 3, wherein the voice engine is configured to control to generate a dedicated VoIP audio object in the native space of the audio application through the dedicated VoIP processing interface for the VoIP packet and process the voice signal input/output using the dedicated VoIP audio object.

5. The apparatus of claim 3, wherein the voice engine is implemented in the native space.

6. The apparatus of claim 1, wherein the dedicated VoIP processing interface is implemented in a kernel space and is configured to control hardware related to the audio processing unit.

7. The apparatus of claim 1, wherein the voice engine is configured to mix the VoIP packet and normal voice packet, when the VoIP packet and normal voice packet occur simultaneously.

8. The apparatus of claim 1, wherein the voice engine is configured to control to acquire device information of the mobile terminal, select a VoIP application that is installable on the mobile terminal according to the device information, and install the selected VoIP application.

9. A Voice over IP (VoIP) processing method of a mobile terminal in a mobile communication system, the method comprising:
   receiving a VoIP packet processing request; and
   processing, when a dedicated voice path for processing the VoIP packet separate from an audio processing path provided by an operating system of the mobile terminal exists, voice signal input/output using a dedicated VoIP processing interface for processing the VoIP packet.

10. The method of claim 9, further comprising processing, when no dedicated voice path exists, the voice signal input/output using an audio application embedded in the operating system of the mobile terminal.

11. The method of claim 10, wherein the audio application comprises:
   an audio record and an audio track in a Java space; and
   an audio record, an audio track, an audio flinger, an audio hardware Advanced Linux Sound Architecture (ALSA), and an ALSA library in a native space.

12. The method of claim 11, wherein processing comprises:
   generating a dedicated VoIP audio object in the native space of the audio application through the dedicated VoIP processing interface for the VoIP packet; and
   processing the voice signal input/output using the dedicated VoIP audio object.

13. The method of claim 9, wherein the dedicated VoIP processing interface is implemented in a kernel space and controls hardware related to the audio processing unit.

14. The method of claim 9, wherein processing comprises mixing the VoIP packet and normal voice packet, when the VoIP packet and normal voice packet occur simultaneously.

15. The method of claim 9, further comprising:
   acquiring device information of the mobile terminal;
   selecting a VoIP application that is installable on the mobile terminal according to the device information; and
   installing the selected VoIP application.

16. A mobile terminal for use in a mobile communication system, the mobile terminal comprising:
- a speaker;
- a microphone;
- a Radio Frequency (RF) unit configured to transmit and receive a VoIP packet;
- an audio processing unit coupled to the speaker and the microphone, the audio processing unit configured to process audio signals; and
- a voice engine configured to control, when a dedicated voice path for processing the VoIP packet separate from an audio processing path provided by an operating system of the mobile terminal exists, to process voice signal input/output using a dedicated VoIP processing interface for processing the VoIP packet.

17. The mobile terminal of claim 16, wherein the voice engine is configured to control, when no dedicated voice path exists, to process the voice signal input/output using an audio application embedded in the operating system of the mobile terminal.

18. The mobile terminal of claim 17, wherein the audio application comprises:
- an audio record and an audio track in a Java space; and
- an audio record, an audio track, an audio flinger, an audio hardware Advanced Linux Sound Architecture (ALSA), and an ALSA library in a native space.

19. The mobile terminal of claim 18, wherein the voice engine is configured to control to generate a dedicated VoIP audio object in the native space of the audio application through the dedicated VoIP processing interface for the VoIP packet and process the voice signal input/output using the dedicated VoIP audio object.

20. The mobile terminal of claim 18, wherein the voice engine is implemented in the native space.

* * * * *